US011069343B2

(12) United States Patent
Xiang et al.

(10) Patent No.: US 11,069,343 B2
(45) Date of Patent: Jul. 20, 2021

(54) VOICE ACTIVATION METHOD, APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Qianbiao Xiang, Shenzhen (CN); Menglin Chen, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 205 days.

(21) Appl. No.: 16/419,924

(22) Filed: May 22, 2019

(65) Prior Publication Data
US 2019/0272820 A1    Sep. 5, 2019

Related U.S. Application Data

(63) Continuation of application No. PCT/CN2018/074312, filed on Jan. 26, 2018.

(30) Foreign Application Priority Data

Feb. 16, 2017   (CN) .......................... 201710084311.4

(51) Int. Cl.
G10L 15/08    (2006.01)
B60K 35/00    (2006.01)
(Continued)

(52) U.S. Cl.
CPC .............. *G10L 15/08* (2013.01); *B60K 35/00* (2013.01); *G10L 15/02* (2013.01); *G10L 15/20* (2013.01);
(Continued)

(58) Field of Classification Search
CPC ......... G10L 15/18; G10L 15/02; G10L 15/20; G10L 15/22; G10L 25/51; G10L 25/84;
(Continued)

(56) References Cited

U.S. PATENT DOCUMENTS 7,080,014 B2 * 7/2006 Bush ........................ G06F 3/167
                                                    704/275
7,567,900 B2 * 7/2009 Suzuki ..................... G10L 25/78
                                                    704/208
(Continued)

FOREIGN PATENT DOCUMENTS

CN        1802694 A        7/2006
CN      105096939 A       11/2015
(Continued)

OTHER PUBLICATIONS

The World Intellectual Property Organization (WIPO) International Search Report for PCT/CN2018/074312 dated May 9, 2018 7 Pages (including translation).

*Primary Examiner* — Mohammad K Islam
(74) *Attorney, Agent, or Firm* — Anova Law Group, PLLC

(57) ABSTRACT

Embodiments of the present disclosure disclose a voice activation method, an apparatus, an electronic device, and a storage medium thereof. The voice activation method includes: capturing a voice signal in a vehicle; calculating an acoustic score of an activation keyword extracted from the voice signal, the acoustic score being used for indicating authenticity of the activation keyword, the authenticity of the activation keyword being a probability that the activation keyword is used for waking up the electronic device to perform a voice activation operation, and a magnitude of the acoustic score being positively correlated to a magnitude of the probability; determining a voice activation threshold according to a noise level in the vehicle, a magnitude of the
(Continued)

voice activation threshold being negatively correlated to a magnitude of the noise; and performing the voice activation operation when the acoustic score is greater than the voice activation threshold.

19 Claims, 3 Drawing Sheets

(51) Int. Cl.
    *G10L 15/20*     (2006.01)
    *G10L 15/22*     (2006.01)
    *G10L 25/84*     (2013.01)
    *G10L 15/02*     (2006.01)
    *G10L 25/51*     (2013.01)
    *G10L 25/78*     (2013.01)

(52) U.S. Cl.
    CPC ........... *G10L 15/22* (2013.01); *G10L 25/51* (2013.01); *G10L 25/84* (2013.01); *B60K 2370/148* (2019.05); *G10L 2015/088* (2013.01); *G10L 2015/223* (2013.01); *G10L 2025/783* (2013.01)

(58) Field of Classification Search
    CPC ......... G10L 2015/008; G10L 2015/223; G10L 2025/783; B60K 35/00; B60K 2370/148
    See application file for complete search history.

(56) References Cited

U.S. PATENT DOCUMENTS

| | | | | |
|---|---|---|---|---|
| 8,577,677 | B2 * | 11/2013 | Kim | G10L 21/0272 |
| | | | | 704/228 |
| 9,899,021 | B1 * | 2/2018 | Vitaladevuni | G10L 15/14 |
| 10,037,313 | B2 * | 7/2018 | Wang | G10L 25/84 |
| 10,199,051 | B2 * | 2/2019 | Binder | G10L 15/22 |
| 10,297,250 | B1 * | 5/2019 | Blanksteen | G10L 21/02 |
| 10,424,292 | B1 * | 9/2019 | Thimsen | G10L 25/84 |
| 10,789,041 | B2 * | 9/2020 | Kim | G10L 15/20 |
| 10,796,702 | B2 * | 10/2020 | Li | G10L 17/00 |
| 10,878,826 | B2 * | 12/2020 | Li | G10L 17/22 |
| 2004/0260547 | A1 | 12/2004 | Cohen et al. | |
| 2012/0310646 | A1 | 12/2012 | Hu et al. | |
| 2014/0222436 | A1 * | 8/2014 | Binder | G10L 21/16 |
| | | | | 704/275 |
| 2014/0278389 | A1 * | 9/2014 | Zurek | G10L 15/20 |
| | | | | 704/231 |
| 2015/0302856 | A1 * | 10/2015 | Kim | G10L 25/48 |
| | | | | 704/273 |
| 2017/0031420 | A1 | 2/2017 | Wong et al. | |
| 2017/0148444 | A1 * | 5/2017 | Bocklet | G10L 15/22 |
| 2018/0350382 | A1 * | 12/2018 | Bullough | G10L 21/0232 |

FOREIGN PATENT DOCUMENTS

| | | |
|---|---|---|
| CN | 105261368 A | 1/2016 |
| CN | 106062661 A | 10/2016 |
| CN | 106254612 A | 12/2016 |
| WO | 2015048254 A1 | 4/2015 |

* cited by examiner

VOICE ACTIVATION METHOD, APPARATUS, ELECTRONIC DEVICE, AND STORAGE MEDIUM

RELATED APPLICATION

This application claims priority to PCT Application No. PCT/CN2018/074312, filed on Jan. 26, 2018, which claims priority to Chinese Patent Application No. 201710084311.4, entitled "VOICE ACTIVATION METHOD AND APPARATUS" filed with the National Intellectual Property Administration, on Feb. 16, 2017. The two applications are incorporated by reference in their entirety.

FIELD OF THE TECHNOLOGY

Embodiments of the present disclosure relate to the field of voice processing technologies, and in particular, to a voice activation method, an apparatus, an electronic device, and a storage medium.

BACKGROUND OF THE DISCLOSURE

Voice activation refers to when a user activates an electronic device by saying an activation keyword to enable the electronic device to enter a state of waiting for a voice instruction or executing a voice instruction. Voice activation is usually applied to an electronic device, such as an on board device in a vehicle. Using voice activation technologies, a driver can control an on board device with an audio command.

Because the cabin of a vehicle may be noisy during high-speed vehicle traveling, and a voice signal received by an on board device includes voice corresponding to an activation keyword said by a user and noise in the vehicle, the onboard device needs to perform noise reduction on the voice signal and then perform voice activation by using the noise-reduced voice. During noise reduction, a noise reduction hardware module may be added to a microphone, and noise reduction is performed through the noise reduction hardware module on a voice signal captured by the microphone.

When the environment is relatively loud, even though the noise reduction hardware module performs noise reduction on the voice signal, the noise in the obtained voice signal is still relatively loud, and affects the success rate of voice activation functions. In addition, the added noise reduction hardware module increases costs of the onboard device, and after the noise reduction hardware module is added, a circuit of the microphone also needs to be adjusted, further increasing costs of the onboard device.

SUMMARY

The embodiments of the present disclosure provide a voice activation method, an apparatus, an electronic device, and a storage medium, for resolving a problem that noise in a voice signal that has been processed by a noise reduction hardware module is relatively loud and affects accuracy of voice activation, and a problem that costs of an onboard device are increased. The technical solutions are as follows:

According to an aspect, a voice activation method is provided. The method is implemented in an electronic device in a vehicle. The method includes the steps of: capturing a voice signal in a vehicle; calculating an acoustic score of an activation keyword extracted from the voice signal, the acoustic score being used for indicating authenticity of the activation keyword, the authenticity of the activation keyword being a probability that the activation keyword is used for waking up the electronic device to perform a voice activation operation, and a magnitude of the acoustic score being positively correlated to a magnitude of the probability; determining a voice activation threshold according to a noise level in the vehicle, a magnitude of the voice activation threshold being negatively correlated to a magnitude of the noise; and performing the voice activation operation when the acoustic score is greater than the voice activation threshold.

According to another aspect of the present disclosure, a voice activation apparatus is provided. The apparatus is used with an electronic device located in a vehicle, and including: a capturing module, configured to capture a voice signal in a vehicle; and a calculation module, configured to calculate an acoustic score of an activation keyword extracted from the voice signal obtained by the capturing module, the acoustic score indicating authenticity of the activation keyword, the authenticity of the activation keyword being a probability that the activation keyword is used for activating the electronic device, and a magnitude of the acoustic score being positively correlated to a magnitude of the probability. The apparatus further includes a first determining module, configured to determine a voice activation threshold according to a noise level in the vehicle, a magnitude of the voice activation threshold being negatively correlated to the noise level; and an execution module, configured to perform the voice activation operation when the acoustic score calculated by the calculation module is greater than the voice activation threshold obtained by the first determining module.

According to another aspect of the present disclosure, an electronic device is provided, the electronic device including one or more processors and a memory. The memory stores one or more programs, the one or more programs being configured to be executed by the one or more processors, and the one or more programs comprising instructions for performing the following operations: capturing a voice signal in a vehicle; calculating an acoustic score of an activation keyword extracted from the voice signal, the acoustic score being used for indicating authenticity of the activation keyword, the authenticity of the activation keyword being a probability that the activation keyword is used for waking up the electronic device to perform a voice activation operation, and a magnitude of the acoustic score being positively correlated to a magnitude of the probability; determining a voice activation threshold according to a noise level in the vehicle, a magnitude of the voice activation threshold being negatively correlated to a magnitude of the noise; and performing the voice activation operation when the acoustic score is greater than the voice activation threshold.

In the present disclosure, the electronic device calculates an acoustic score of a activation keyword, compares the acoustic score with a voice activation threshold, and determines whether to perform a voice operation according to a comparison result. Even though noise in the voice signal is relatively loud, a voice activation operation can be performed provided that the acoustic score of the activation keyword in the voice signal is greater than the voice activation threshold, thereby improving the success rate of voice activation.

Further, the electronic device determines a voice activation threshold according to noise in the vehicle, lowers the voice activation threshold when the noise is louder, thereby improving a success rate of voice activation, and raises the voice activation threshold when the noise is smaller, thereby reducing a false activation rate of voice activation.

When the electronic device is an onboard device, because no noise reduction hardware module is needed to be added to the onboard device, cost of the onboard device can be reduced. In addition, because no noise reduction hardware module needs to be added into the onboard device, a circuit of a microphone does not need to be adjusted either, thereby further reducing costs of the onboard device.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the technology may still derive other drawings from these accompanying drawings without creative efforts.

DESCRIPTION OF EMBODIMENTS

Figure 1:
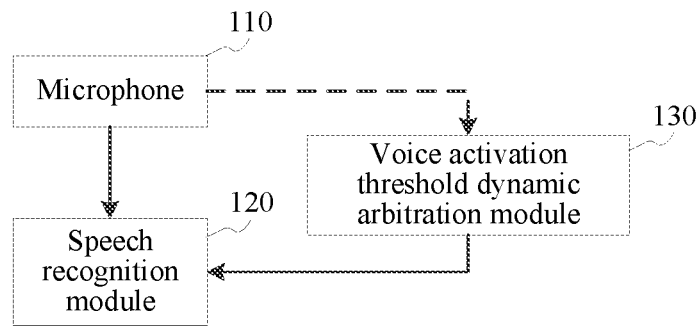
FIG. 1 is a schematic structural diagram of a voice activation apparatus shown according to some exemplary embodiments.

To make the objectives, technical solutions, and advantages of the embodiments of the present disclosure clearer, the following further describes implementations of the present disclosure in detail with reference to the accompanying drawings.

Various terms involved in the embodiments of the present disclosure are explained as follows.

Electronic device placed in a vehicle: an electronic device in a vehicle involved in this embodiment includes an electronic device mounted in the vehicle and/or a mobile terminal located in the vehicle. The electronic device mounted in the vehicle may be a center console, an onboard device, an intelligent rear view mirror, or the like. This is not limited in this embodiment. The mobile terminal in the vehicle may be a mobile phone, a tablet computer, a wearable device, or the like. This is not limited in this embodiment.

Center console: an operation console of a vehicle. When the electronic device is a center console, an operating system installed in the center console performs the voice activation method.

Onboard device: an abbreviation of an in-vehicle infotainment product mounted in the vehicle. The onboard device may be connected to a wireless network through a Wireless Fidelity (Wi-Fi) network or a mobile network. A program provided by a third service provider, such as a game program or a navigation program, installed by a user provides functions such as drive recording, Global Positioning System (GPS) positioning, electronic velocity measurement prompting, vehicle backup camera, and real-time online audio and video entertainment, and may further implement communication between a person and a vehicle or between a vehicle and a vehicle. When the electronic device is an onboard device, the operating system installed in the onboard device performs the voice activation method.

Intelligent rear view mirror: an intelligent rear view mirror having an independent operating system or a software control program, and an independent operating space. Functions of the intelligent rear view mirror are similar to those of the onboard device, and the intelligent rear view mirror differs from the onboard device in respect of a product form. When the electronic device is an intelligent rear view mirror, the operating system installed in the intelligent rear view mirror performs the voice activation method.

Activation keyword: a character string for waking up the electronic device to perform a voice activation operation. For example, the activation keyword may be "Hello, Phil" or the like. The activated electronic device may perform a voice activation operation.

Voice instruction: an instruction for phonetically controlling the electronic device to perform a predetermined operation. For example, the voice instruction may be "Navigate to home", "Play music", or the like.

Acoustic score: An acoustic score is used for indicating authenticity of an activation keyword. The acoustic score is positively correlated to the authenticity of the activation keyword. That is, the authenticity of the activation keyword is higher if the acoustic score is higher, and the authenticity of the activation keyword is lower if the acoustic score is lower.

Authenticity of an activation keyword: Authenticity of an activation keyword is a probability that the activation keyword is used for waking up the electronic device to perform a voice activation operation. For example, the activation keyword is "Phil". If a statement said by a user is "Phil will come for dinner today", and this statement includes a name of a friend, "Phil", in this case, the activation keyword "Phil" is not used for waking up the electronic device to perform a voice activation operation, and authenticity of the activation keyword is relatively low. If a statement said by a user is "Phil", and the activation keyword "Phil" in the statement is used for waking up the electronic device to perform a voice activation operation, authenticity of activation keyword is relatively high.

Voice activation threshold: A voice activation threshold is used by the electronic device to determine whether to perform a voice activation operation according to an activation keyword. When an acoustic score of the activation keyword is greater than the voice activation threshold, the voice activation operation is performed. When an acoustic score of the activation keyword is smaller than the voice activation threshold, the voice activation operation is not performed.

Noise in the vehicle: Noise in the vehicle includes engine noise, road noise, tire noise, wind noise, resonance noise, and the like. Engine noise is the noise generated by rotation of an engine. Road noise includes the noise generated by wind shearing when a vehicle travels, noise generated by vibrations of a chassis caused by traveling, and the noise generated by impacts of sand and stones on a chassis. Tire noise is the noise generated by friction between tires and a road surface. Wind noise is the noise generated by entering by oncoming wind into a vehicle because pressure of the oncoming wind exceeds sealing resistance of a vehicle door during a traveling process of the vehicle. Resonance noise is the noise generated by resonance formed by refracting and overlapping noise in a vehicle.

FIG. 1 is a schematic structural diagram of a voice activation apparatus according to an embodiment of the present disclosure. The voice activation apparatus includes a microphone 110, a speech recognition module 120, and a voice activation threshold dynamic arbitration module 130. The microphone 110 and the voice activation threshold dynamic arbitration module 130 are separately connected to the speech recognition module 120, which is shown by solid lines in FIG. 1. The microphone 110 and the voice activation threshold dynamic arbitration module 130 may be connected to each other or not, which is shown by a dashed line in FIG. 1.

Functions of modules in the voice activation apparatus located in the vehicle are described below.

When the microphone 110 is in a working state, the microphone 110 continuously captures voice signals in the vehicle, and sends, at intervals of a predetermined time period, voice signals captured in the time period to the speech recognition module 120. A time length of the predetermined time period is usually set to be relatively short. For example, the time length of the predetermined time period ranges from 20 ms to 30 ms. The value of the predetermined time period is not limited in this embodiment.

The voice activation threshold dynamic arbitration module 130 is configured to obtain noise in the vehicle, dynamically determine a voice activation threshold according to the noise, and send the voice activation threshold to the speech recognition module 120.

The speech recognition module 120 is configured to recognize an activation keyword in a voice signal, calculate an acoustic score of the activation keyword, compare the acoustic score with a voice activation threshold, and determine whether to perform a voice activation operation according to a comparison result.

It should be noted that when the microphone 110 and the voice activation threshold dynamic arbitration module 130 are connected to each other, the microphone 110 may send a captured voice signal to the voice activation threshold dynamic arbitration module 130, and the voice activation threshold dynamic arbitration module 130 determines noise in the vehicle according to the voice signal. When the microphone 110 and the voice activation threshold dynamic arbitration module 130 are not connected to each other, the voice activation threshold dynamic arbitration module 130 may obtain noise in the vehicle in another manner.

In related technology, the voice activation threshold is a fixed value, and if the voice activation threshold is lower, an activation success rate is higher, and a false activation rate is higher. If the voice activation threshold is higher, an activation success rate is lower, and a false activation rate is lower. However, noise in a vehicle dynamically changes. If the noise in the vehicle is relatively low, it indicates that a statement said by a user is relatively clear, in this case, the voice activation threshold may be set to be relatively large, to reduce a false activation rate, and in this case, if the voice activation threshold set to be relatively small, consequently, a false activation rate is relatively high. If the noise in the vehicle is relatively loud, it indicates that a statement said by a user is not so clear, in this case, the voice activation threshold may be set to be relatively small, to increase an activation success rate, and in this case, if the voice activation threshold is set to be relatively large, consequently, an activation success rate is relatively low. Therefore, the voice activation threshold needs to be dynamically determined according to the noise in the vehicle, to achieve a balance between the false activation rate and the activation success rate.

Figure 2:
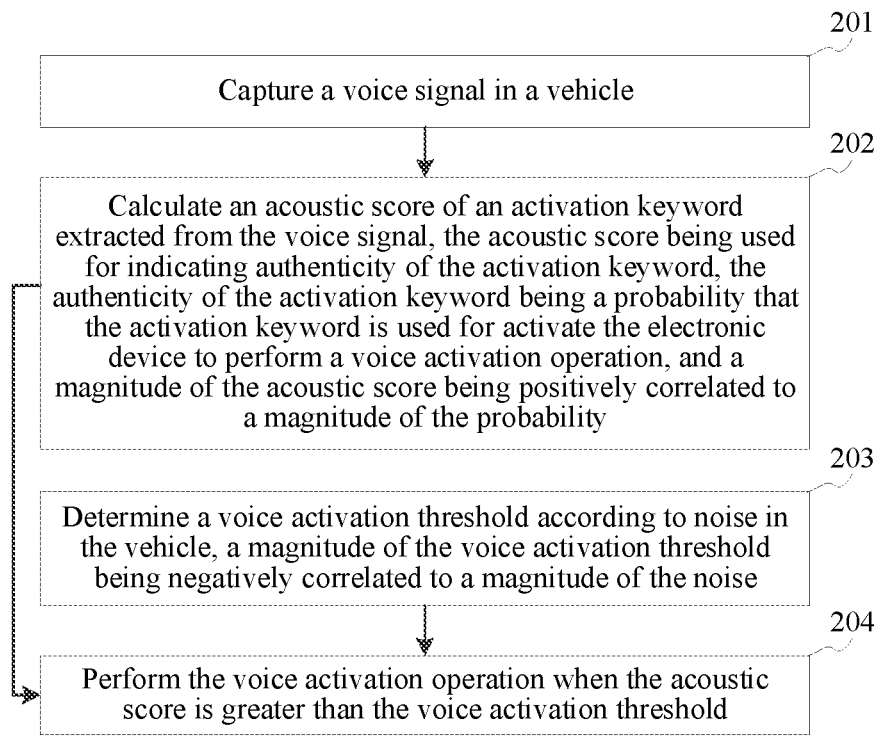
FIG. 2 is a method flowchart of a voice activation method according to an embodiment of the present disclosure.

FIG. 2 is a method flowchart of a voice activation method according to an embodiment of the present disclosure. The voice activation method may be applied to an electronic device including the voice activation apparatus shown in FIG. 1. The voice activation method includes the following steps.

Step 201: Capture a voice signal in a vehicle.

The electronic device may capture a voice signal in a vehicle through a microphone. The voice signal includes voice corresponding to an activation keyword said by a user and noise in the vehicle.

Step 202: Calculate an acoustic score of an activation keyword extracted from the voice signal, the acoustic score being used for indicating authenticity of the activation keyword, the authenticity of the activation keyword being a probability that the activation keyword is used for waking up the electronic device to perform a voice activation operation, and a magnitude of the acoustic score being positively correlated to a magnitude of the probability.

In some application scenarios, an activation keyword may be said by a user not for waking up the electronic device to perform a voice activation operation. For example, the activation keyword is "Phil". If a statement said by a user is "Phil will come for dinner today", "Phil" included in this statement may be a name of a friend, and in this case, the activation keyword "Phil" is not used for waking up the electronic device to perform a voice activation operation. Therefore, after the activation keyword is extracted from the voice signal, an acoustic score of the activation keyword further needs to be calculated, and then, whether or not the activation keyword is used for waking up the electronic device to perform a voice activation operation is determined according to the acoustic score. The acoustic score is a probability that the activation keyword is used for waking up the electronic device to perform a voice activation operation, and a magnitude of the acoustic score is positively correlated to a magnitude of the probability. That is, if the acoustic score of the activation keyword is higher, a probability that the activation keyword is used for waking up the electronic device to perform voice activation operation is larger; and if the acoustic score of the activation keyword is lower, a probability that the activation keyword is used for waking up the electronic device to perform voice activation operation is smaller.

For example, if an acoustic score of a specific activation keyword is 50.

Step 203: Determine a voice activation threshold according to noise in the vehicle, a magnitude of the voice activation threshold being negatively correlated to a magnitude of the noise.

Because noise in a vehicle dynamically changes, to ensure accuracy of the noise in the vehicle, the electronic device may obtain the noise in the vehicle when capturing a voice signal.

A predetermined algorithm is set in the electronic device. The electronic device calculates a voice activation threshold according to the predetermined algorithm and noise. The voice activation threshold is negatively correlated to a magnitude of the noise. That is, the voice activation threshold is smaller if the noise is louder, and the voice activation threshold is larger if the noise is lower.

Step 204: Perform the voice activation operation when the acoustic score is greater than the voice activation threshold.

The electronic device compares the acoustic score and the voice activation threshold. When the acoustic score is greater than the voice activation threshold, the electronic device is woken up according to the activation keyword, and the electronic device performs a voice activation operation. When the acoustic score is smaller than the voice activation threshold, the electronic device does not perform a voice activation operation, and the electronic device is still in a to-be-activated mode, and performing of step 201 is continued.

In conclusion, in the voice activation method provided by the embodiments of the present disclosure, the electronic device calculates an acoustic score of an activation keyword, compares the acoustic score with a voice activation threshold, and determines whether to perform a voice operation according to a comparison result. Accordingly, even though noise in the voice signal is relatively loud, a voice activation operation can be performed provided that the acoustic score of the activation keyword in the voice signal is greater than the voice activation threshold, thereby improving a success rate of voice activation.

The electronic device determines a voice activation threshold according to noise in the vehicle, lowers the voice activation threshold when the noise is louder, thereby improving a success rate of voice activation, and raises the voice activation threshold when the noise is smaller, thereby reducing a false activation rate of voice activation.

When the electronic device is an onboard device, because no noise reduction hardware module needs to be added into the onboard device, costs of the onboard device can be reduced. In addition, because no noise reduction hardware module needs to be added into the onboard device, a circuit of a microphone does not need to be adjusted either, thereby further reducing costs of the onboard device.

Figure 3:
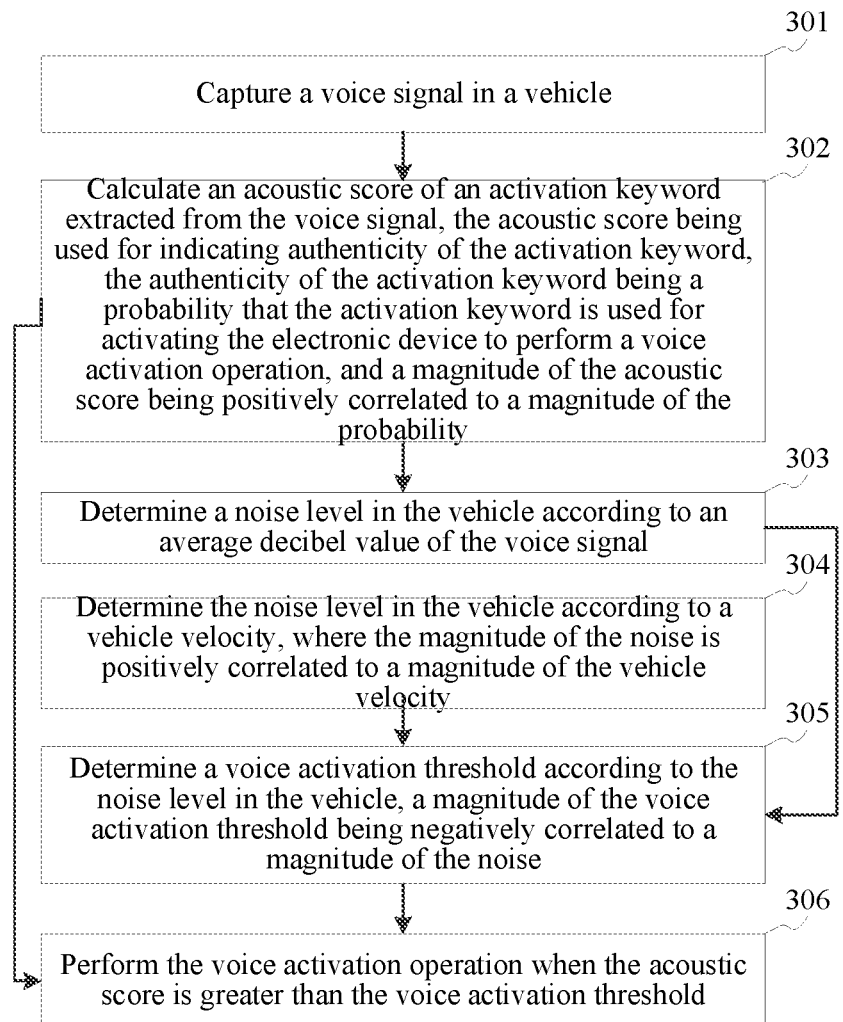
FIG. 3 is a method flowchart of a voice activation method according to another embodiment of the present disclosure.

FIG. 3 is a method flowchart of a voice activation method according to another detailed embodiment of the present disclosure. The voice activation method may be applied to an electronic device including the voice activation apparatus shown in FIG. 1. The voice activation method includes the following steps.

Step 301: Capture a voice signal in a vehicle.

The electronic device may capture a voice signal in a vehicle through a microphone. In such an implementation, the electronic device first needs to start a voice activation module, so that the electronic device enters a to-be-activated mode, and the microphone in a to-be-activated mode starts to work and captures a voice signal in a vehicle in real time. Specifically, the microphone continuously captures voice signals, and sends, at intervals of a predetermined time period, segments of the voice signals captured in the time period to a speech recognition module. A time length of the predetermined time period is usually set to be relatively short. For example, the time length of the predetermined time period ranges from 20 ms to 30 ms. The value of the predetermined time period is not limited in this embodiment.

The voice activation module may be started in various manners. For example, the voice activation module is started by default when the electronic device is started, or a start button of the voice activation module is disposed in the electronic device, and when receiving an operation signal of acting on the start button from a user, the electronic device starts the voice activation module and the like. A manner of starting the voice activation module is not limited in this embodiment.

In this embodiment, the voice signal includes voice corresponding to an activation keyword said by a user and noise in the vehicle. For example, if an activation keyword said by a user is "Phil", a voice signal captured by the microphone includes voice of "Phil" and noise in the vehicle.

Step 302: Calculate an acoustic score of an activation keyword extracted from the voice signal, the acoustic score being used for indicating authenticity of the activation keyword, the authenticity of the activation keyword being a probability that the activation keyword is used for waking up the electronic device to perform a voice activation operation, and a magnitude of the acoustic score being positively correlated to a magnitude of the probability.

The electronic device may extract the activation keyword from the voice signal through a speech recognition module. In a possible implementation, a language model is preset in the speech recognition module, and the electronic device extracts the activation keyword from the voice signal through the language model.

In some application scenarios, an activation keyword may be said by a user not for waking up the electronic device to perform a voice activation operation. For example, the activation keyword is "Phil". If a statement said by a user is "Phil will come for dinner today", "Phil" included in this statement may be a name of a friend, and in this case, the activation keyword "Phil" is not used for waking up the electronic device to perform a voice activation operation. Therefore, after the activation keyword is extracted from the voice signal, an acoustic score of the activation keyword further needs to be calculated.

The electronic device may calculate the acoustic score of the extracted activation keyword through the speech recognition module. In a possible implementation, an acoustic model is preset in the speech recognition module, and the electronic device calculates the acoustic score of the extracted activation keyword through the acoustic model.

The acoustic score is a probability that the activation keyword is used for waking up the electronic device to perform a voice activation operation, and a magnitude of the acoustic score is positively correlated to a magnitude of the probability. That is, if the acoustic score of the activation keyword is higher, a probability that the activation keyword is used for waking up the electronic device to perform voice activation operation is larger; and if the acoustic score of the activation keyword is lower, a probability that the activation keyword is used for waking up the electronic device to perform voice activation operation is smaller.

The electronic device also needs to determine noise in the vehicle. This embodiment provides two noise determining manners. The two determining manners are described through steps 303 and 304 respectively. During actual implementation, the electronic device may perform only step 303, or only step 304, or both step 303 and step 304, calculates an average value of noise obtained in steps 303 and 304, and uses the average value as finally calculated noise, to improve accuracy of noise calculation.

Step 303: Determine noise in the vehicle according to an average decibel value of the voice signal.

Because the voice signal includes noise in the vehicle when the user says the activation keyword, the microphone may alternatively send the captured voice signal to a voice activation threshold dynamic arbitration module, and the voice activation threshold dynamic arbitration module calculates an average decibel value of the voice signal, and determines the noise in the vehicle according to the average decibel value. In related technology, the technology of determining nose according to an average decibel value of a voice signal has been very sophisticated. Details are not described herein again in this embodiment.

Because the noise in the vehicle included in the voice signal is the noise in the vehicle when the user says the activation keyword, the noise determined at this moment is relatively accurate.

In some embodiments, step 303 may alternatively be replaced with capturing at least one segment of voice signal before obtaining the voice signal, and determining noise in the vehicle according to an average decibel value of the at least one segment of voice signal.

The voice activation threshold dynamic arbitration module may choose at least one segment of voice signal whose capturing moment is closer to a moment when the user says the activation keyword, thereby improving accuracy of the determined noise. For example, a moment when the microphone starts to capture a voice signal is marked as 0, a voice signal received by the voice activation threshold dynamic arbitration module when the user says the activation keyword is a voice signal captured in a period from 150 ms to 180 ms, and a predetermined time interval is 30 ms. Therefore, when one segment of voice signal needs to be obtained, the voice activation threshold dynamic arbitration module may obtain a voice signal captured in a period from 120 ms to 150 ms, and when three segments of voice signal need to be obtained, the voice activation threshold dynamic arbitration module may obtain a voice signal captured in a period from 60 ms to 150 ms.

Because the voice activation threshold dynamic arbitration module may determine the noise in the vehicle according to the at least one segment of voice signal before receiving the voice signal captured when the user says the activation keyword instead of determine the noise in the vehicle after receiving the voice signal captured when the user says the activation keyword, the noise may be determined in advance, thereby determining a voice activation threshold in advance, and improving efficiency of voice activation.

It should be noted that when the implementation of determining noise in the vehicle according to an average decibel value of at least one segment of voice signal is used, the microphone may alternatively send a voice signal captured when the user says the activation keyword to the voice activation threshold dynamic arbitration module; the voice activation threshold dynamic arbitration module determines noise in the voice signal, and then, sends the noise and the voice signal to the speech recognition module; the speech recognition module performs noise reduction on the voice signal by using a noise reduction solution in related technology, then, extracts an activation keyword from the noise-reduced voice signal, and calculates an acoustic score of the activation keyword, to improve accuracy of the acoustic score.

In some embodiments, step 303 may alternatively be replaced with capturing at least one segment of voice signal before obtaining the voice signal, and determining noise in the vehicle according to an average decibel value of all captured voice signals.

In this case, the all voice signals include a voice signal captured when the user says the activation keyword and at least one segment of voice signal captured before the voice signal. For detailed descriptions of the at least one segment of voice signal captured before the voice signal, refer to descriptions in the foregoing implementation. Details are not described herein again.

Step 304: Determine the noise in the vehicle according to a vehicle velocity, where the magnitude of the noise is positively correlated to a magnitude of the vehicle velocity.

Because if a vehicle velocity is higher, noise, such as engine noise, road noise, tire noise, wind noise, and resonance noise, is louder, and if a vehicle velocity is lower, noise, such as engine noise, road noise, tire noise, wind noise, and resonance noise, is lower, the electronic device may alternatively determine the noise in the vehicle according to the vehicle velocity. In a possible implementation, a correspondence between a vehicle velocity and noise is preset in the electronic device, and after obtaining a vehicle velocity, the electronic device determines the noise according to the correspondence.

The electronic device may obtain a vehicle velocity in various manners. For example, the electronic device obtains, through the GPS, a distance traveled within a time period t, and divides the distance by the time period to obtain a vehicle velocity. Alternatively, a velocimeter is preset in the electronic device, and the electronic device measures a vehicle velocity and the like through the velocimeter. This is not limited in this embodiment.

Step 305: Determine a voice activation threshold according to the noise in the vehicle, a magnitude of the voice activation threshold being negatively correlated to a magnitude of the noise.

A predetermined algorithm is set in the electronic device. The electronic device calculates a voice activation threshold according to the predetermined algorithm and noise. The voice activation threshold is negatively correlated to a magnitude of the noise. That is, the voice activation threshold is smaller if the noise is louder, and the voice activation threshold is larger if the noise is lower.

In a possible implementation, there is a linear relationship between noise and a voice activation threshold. In this case, determining a voice activation threshold according to noise in the vehicle includes: obtaining a preset noise interval and a voice activation threshold interval, where each value in the noise interval corresponds to one value of the voice activation threshold interval; and selecting in the voice activation threshold interval, according to a value of the noise in the noise interval, a value corresponding to the value in the noise interval as the voice activation threshold.

For example, a noise interval is (20, 100) dB, a voice activation threshold interval is (10, 50) dB, and a correspondence between a value in the noise interval and a value of the voice activation threshold interval is that: a value in the noise interval divided by 2 corresponds to a value of the voice activation threshold interval. Therefore, when noise is 60 dB, it is determined that a value of the noise in the noise interval is 60, and a value 30, obtained by dividing 60 by 2 is used as the voice activation threshold.

In another possible implementation, there is a non-linear relationship between noise and a voice activation threshold. In this case, the electronic device may determine a voice activation threshold according to a non-linear algorithm and the noise. This is not limited in this embodiment.

It should be noted that an execution sequence of calculating an acoustic score of an activation keyword and determining a voice activation threshold is not limited in this embodiment. That is, an execution sequence of step 302 and steps 303-305 is not limited in this embodiment.

Step 306: Perform the voice activation operation when the acoustic score is greater than the voice activation threshold.

The electronic device compares the acoustic score and the voice activation threshold. When the acoustic score is greater than the voice activation threshold, the electronic device is woken up according to the activation keyword, and the electronic device performs a voice activation operation. When the acoustic score is smaller than the voice activation threshold, the electronic device does not perform a voice activation operation, and the electronic device is still in a to-be-activated mode, and performing of step 301 is continued.

In conclusion, in the voice activation method provided by the embodiments of the present disclosure, the electronic device calculates an acoustic score of an activation keyword, compares the acoustic score with a voice activation threshold, and determines whether to perform a voice operation according to a comparison result. Accordingly, even though noise in the voice signal is relatively loud, a voice activation operation can be performed provided that the acoustic score of the activation keyword in the voice signal is greater than the voice activation threshold, thereby improving a success rate of voice activation.

The electronic device determines a voice activation threshold according to noise in the vehicle, lowers the voice activation threshold when the noise is louder, thereby improving a success rate of voice activation, and raises the voice activation threshold when the noise is smaller, thereby reducing a false activation rate of voice activation.

When the electronic device is an onboard device, because no noise reduction hardware module needs to be added into the onboard device, costs of the onboard device can be reduced. In addition, because no noise reduction hardware module needs to be added into the onboard device, a circuit of a microphone does not need to be adjusted either, thereby further reducing costs of the onboard device.

Because the voice activation threshold dynamic arbitration module may determine the noise in the vehicle according to the at least one segment of voice signal before receiving the voice signal captured when the user says the activation keyword instead of determine the noise in the vehicle after receiving the voice signal captured when the user says the activation keyword, the noise may be determined in advance, thereby determining a voice activation threshold in advance, and improving efficiency of voice activation.

Apparatus embodiments of the present disclosure are described below, and may be used to perform the method embodiments of the present disclosure. For details not disclosed in the apparatus embodiments of the present disclosure, refer to the method embodiments of the present disclosure.

Figure 4:
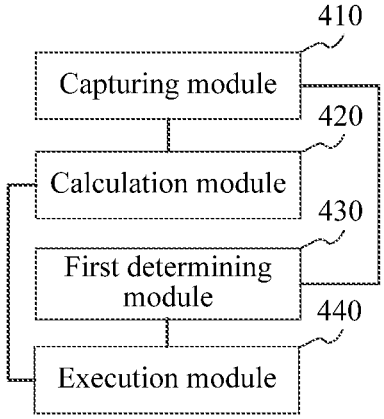
FIG. 4 is a structural block diagram of a voice activation apparatus according to an embodiment of the present disclosure.

FIG. 4 is a structural block diagram of a voice activation apparatus according to an embodiment of the present disclosure. The voice activation apparatus may be applied to an electronic device including the voice activation apparatus shown in FIG. 1. The voice activation apparatus includes: a capturing module 410, configured to capture a voice signal in a vehicle; a calculation module 420, configured to calculate an acoustic score of an activation keyword extracted from the voice signal obtained by the capturing module 410, the acoustic score being used for indicating authenticity of the activation keyword, the authenticity of the activation keyword being a probability that the activation keyword is used for waking up the electronic device to perform a voice activation operation, and a magnitude of the acoustic score being positively correlated to a magnitude of the probability; a first determining module 430, configured to determine a voice activation threshold according to noise in the vehicle, a magnitude of the voice activation threshold being negatively correlated to a magnitude of the noise; and an execution module 440, configured to perform the voice activation operation when the acoustic score calculated by the calculation module 420 is greater than the voice activation threshold obtained by the first determining module 430.

In some embodiments, the voice activation apparatus further includes: a second determining module, configured to determine noise in the vehicle according to an average decibel value of the voice signal before the first determining module 430 determines the voice activation threshold according to the noise in the vehicle; or a third determining module, configured to capture at least one segment of voice signal before obtaining the voice signal, and determine noise in the vehicle according to an average decibel value of the at least one segment of voice signal before the first determining module 430 determines the voice activation threshold according to the noise in the vehicle; or a fourth determining module, configured to capture at least one segment of voice signal before obtaining the voice signal, and determine noise in the vehicle according to an average decibel value of all captured voice signals before the first determining module 430 determines the voice activation threshold according to the noise in the vehicle.

In some embodiments, the voice activation apparatus further includes: a fifth determining module, configured to determine noise in the vehicle according to a vehicle velocity before the first determining module 430 determines the voice activation threshold according to the noise in the vehicle, where the magnitude of the noise is positively correlated to a magnitude of the vehicle velocity.

In some embodiments, the first determining module 430 is further configured to: obtain a preset noise interval and a voice activation threshold interval, where each value in the noise interval corresponds to one value of the voice activation threshold interval; and select in the voice activation threshold interval, according to a value of the noise in the noise interval, a value corresponding to the value in the noise interval as the voice activation threshold.

In some embodiments, the electronic device located in the vehicle is an electronic device mounted in the vehicle or a mobile terminal located in the vehicle, and the electronic device mounted in the vehicle is a center console, an onboard device, or an intelligent rear view mirror.

In conclusion, in the voice activation apparatus provided by the embodiments of the present disclosure, the electronic device calculates an acoustic score of an activation keyword, compares the acoustic score with a voice activation threshold, and determines whether to perform a voice operation according to a comparison result. Accordingly, even though noise in the voice signal is relatively loud, a voice activation operation can be performed provided that the acoustic score of the activation keyword in the voice signal is greater than the voice activation threshold, thereby improving a success rate of voice activation.

The electronic device determines a voice activation threshold according to noise in the vehicle, lowers the voice activation threshold when the noise is louder, thereby improving a success rate of voice activation, and raises the voice activation threshold when the noise is smaller, thereby reducing a false activation rate of voice activation.

When the electronic device is an onboard device, because no noise reduction hardware module needs to be added into the onboard device, costs of the onboard device can be reduced. In addition, because no noise reduction hardware module needs to be added into the onboard device, a circuit of a microphone does not need to be adjusted either, thereby further reducing costs of the onboard device.

Because the voice activation threshold dynamic arbitration module may determine the noise in the vehicle according to the at least one segment of voice signal before receiving the voice signal captured when the user says the activation keyword instead of determine the noise in the vehicle after receiving the voice signal captured when the user says the activation keyword, the noise may be determined in advance, thereby determining a voice activation threshold in advance, and improving efficiency of voice activation.

Figure 5:
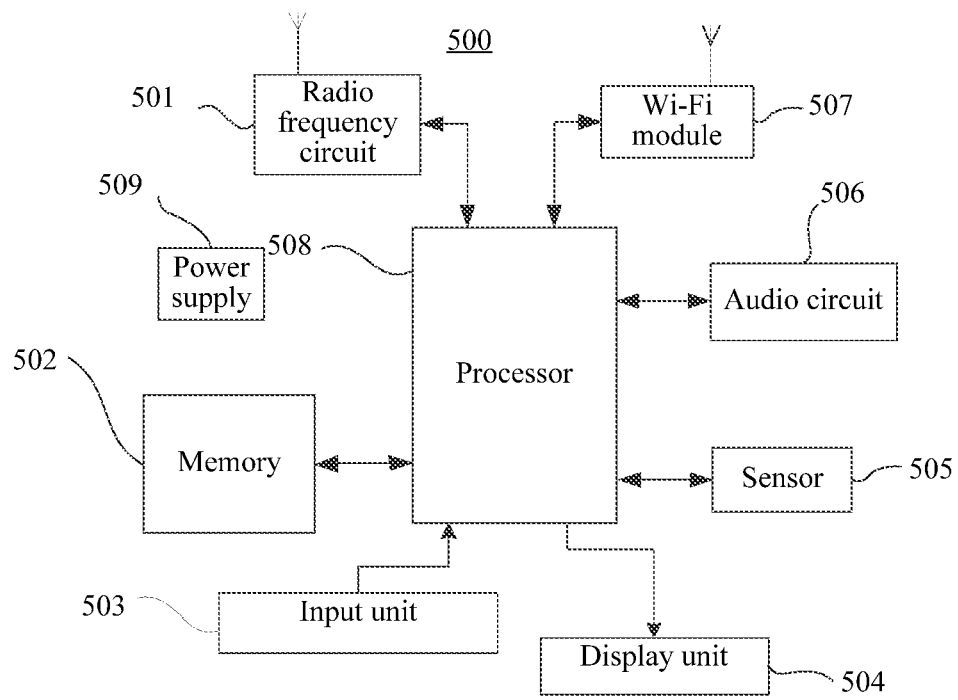
FIG. 5 is a structural block diagram of a voice activation apparatus according to another embodiment of the present disclosure.

FIG. 5 is a structural block diagram of an electronic device 500 according to an embodiment of the present disclosure. The electronic device may include components such as a radio frequency (RF) circuit 501, a memory 502 including one or more computer-readable storage media, an input unit 503, a display unit 504, a sensor 505, an audio circuit 506, a Wi-Fi module 507, a processor 508 including one or more processing cores, and a power supply 509. A person skilled in the art may understand that the electronic device structure shown in FIG. 5 does not constitute a limit to the electronic device. The server may include more or fewer parts than those shown in the figure, may combine some parts, or may have different part arrangements.

The RF circuit 501 may be configured to receive and send signals during an information receiving and sending process or a call process. Particularly, the RF circuit receives downlink information from a base station, then delivers the downlink information to one or more processors 509 for processing, and sends related uplink data to the base station. Generally, the RF circuit 501 includes but is not limited to an antenna, at least one amplifier, a tuner, one or more oscillators, a transceiver, a coupler, a low noise amplifier (LNA), a duplexer, and the like. In addition, the RF circuit 501 may also communicate with a network and another device by wireless communication. The wireless communication may use any communications standard or protocol, which includes but is not limited to, Global System for Mobile Communications (GSM), General Packet Radio Service (GPRS), Code Division Multiple Access (CDMA), Wideband Code Division Multiple Access (WCDMA), Long Term Evolution (LTE), e-mail, Short Message Service (SMS), and the like.

The memory 502 may be configured to store a software program and module. The processor 509 runs the software program and module stored in the memory 502, to implement various functional applications and data processing. The memory 502 may mainly include a program storage area and a data storage area. The program storage area may store an operating system, an application program required by at least one function (such as a sound playback function and an image display function), and the like. The data storage area may store data (such as audio data) created according to use of the electronic device, and the like. In addition, the memory 502 may include a high speed random access memory, and may also include a non-volatile memory, such as at least one magnetic disk storage device, a flash memory, or another volatile solid-state storage device. Correspondingly, the memory 502 may further include a memory controller, so as to provide access of the processor 508 and the input unit 503 to the memory 502.

The input unit 503 may be configured to receive input digit or character information, and generate a keyboard, mouse, joystick, optical, or track ball signal input related to the user setting and function control. Specifically, in a specific embodiment, the input unit 503 may include a touch-sensitive surface and another input device. The touch-sensitive surface, which may also be referred to as a touch screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. In some embodiments, the touch-sensitive surface may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 509. Moreover, the touch controller can receive and execute a command sent from the processor 508. In addition, the touch-sensitive surface may be implemented in multiple types, such as a resistive type, a capacitive type, an infrared type, and a surface acoustic wave type. In addition to the touch-sensitive surface, the input unit 503 may further include another input device. Specifically, the input device may include but is not limited to one or more of a physical keyboard, a function key (for example, a volume control key or a power on/off key), a trackball, a mouse, or a joystick.

The display unit 504 may be configured to display information input by the user or information provided for the user, and various graphical user interfaces of the electronic device. The display unit 504 may include a display panel. In some embodiments, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 508 to determine a type of a touch event, and then the processor 508 provides corresponding visual output on the display panel according to the type of the touch event. Although in FIG. 5, the touch-sensitive surface and the display panel are used as two separate parts to implement input and output functions, in some embodiments, the touch-sensitive surface and the display panel may be integrated to implement the input and output functions.

The electronic device may further include at least one sensor 505, such as an optical sensor and other sensors. Specifically, the optical sensor may include an ambient light sensor. The ambient light sensor may adjust brightness of the display panel according to brightness of ambient light rays.

The audio circuit 506, a speaker, and a microphone may provide audio interfaces between the user and the electronic device. The audio circuit 506 may convert received audio data into an electric signal and transmit the electric signal to the speaker. The speaker converts the electric signal into a sound signal for output. On the other hand, the microphone converts a collected sound signal into an electric signal. The audio circuit 506 receives the electric signal and converts the electric signal into audio data, and outputs the audio data to the processor 509 for processing. Then, the processor 509 sends the audio data to, for example, another electronic device by using the RF circuit 501, or outputs the audio data to the memory 502 for further processing. The audio circuit 506 may further include an earplug jack, to provide communication between a peripheral earphone and the electronic device.

Although FIG. 5 shows the Wi-Fi module 507, it may be understood that the Wi-Fi module 507 is not a necessary component of the electronic device, and when required, the Wi-Fi module 507 may be omitted as long as the scope of the essence of the present disclosure is not changed.

The processor 508 is a control center of the electronic device, which is connected to various parts of the entire device by using various interfaces and lines, and by running or executing a software program and/or module stored in the memory 502 and calling data stored in the memory 502, to implement various functions of the electronic device and process data, so as to perform overall monitoring on the mobile phone. In some embodiments, the processor 508 may include one or more processor cores. Preferably, the processor 508 may integrate an application processor and a modem. The application processor mainly processes an operating system, a user interface, an application program, and the like. The modem mainly processes wireless communication. It may be understood that the foregoing modem may alternatively not be integrated into the processor 508.

The electronic device further includes the power supply 509 (such as a battery) for supplying power to the components. Preferably, the power supply may logically connect to the processor 508 by using a power supply management system, thereby implementing functions, such as charging, discharging, and power consumption management, by using the power supply management system. The power supply 509 may further include one or more of a direct current or alternating current power supply, a re-charging system, a power failure detection circuit, a power supply converter or inverter, a power supply state indicator, and any other components.

Although not shown in the figure, the electronic device may further include a camera, a Bluetooth module, and the like, which are not further described herein. Specifically, in this embodiment, the processor 508 in the electronic device may run one or more program instructions stored in the memory 502, thereby performing a voice activation method according to each one of the foregoing method embodiments.

A person of ordinary skill in the art may understand that all or part of the steps of the methods in the foregoing embodiments may be implemented by a program instructing relevant hardware. The program may be stored in a computer-readable storage medium. The storage medium may include: a read-only memory (ROM), a random access memory (RAM), a magnetic disk, a compact disc, or the like.

An embodiment of the present disclosure provides a computer-readable storage medium, the storage medium storing at least one instruction, at least one program, a code set, or an instruction set, the at least one instruction, the at least one program, the code set, or the instruction set being loaded and executed by the processor to perform the voice activation method as stated above.

An embodiment of the present disclosure provides an electronic device, the electronic device including: one or more processors; and a memory. The memory storing one or more programs, the one or more programs being configured to be executed by the one or more processors, and the one or more programs including instructions for performing the following operations: capturing a voice signal in a vehicle; calculating an acoustic score of an activation keyword extracted from the voice signal, the acoustic score being used for indicating a probability that the activation keyword is used for waking up the electronic device to perform a voice operation, and a magnitude of the acoustic score being positively correlated to a magnitude of the probability; determining a voice activation threshold according to noise in the vehicle, a magnitude of the voice activation threshold being negatively correlated to a magnitude of the noise; and performing a voice activation operation when the acoustic score is greater than the voice activation threshold.

In some embodiments, the one or more programs further include an instruction for performing the following operation: before the determining a voice activation threshold according to noise in the vehicle, determining noise in the vehicle according to an average decibel value of the voice signal; or capturing at least one segment of voice signal before obtaining the voice signal, and determining noise in the vehicle according to an average decibel value of the at least one segment of voice signal; or capturing at least one segment of voice signal before obtaining the voice signal, and determining noise in the vehicle according to an average decibel value of all captured voice signals.

In some embodiments, the one or more programs further include an instruction for performing the following operation: determining the noise in the vehicle according to a vehicle velocity before the determining a voice activation threshold according to noise in the vehicle, where the magnitude of the noise is positively correlated to a magnitude of the vehicle velocity.

In some embodiments, the one or more programs further include an instruction for performing the following operations: obtaining a preset noise interval and a voice activation threshold interval, where each value in the noise interval corresponds to one value of the voice activation threshold interval; and selecting the voice activation threshold interval, according to a value of the noise in the noise interval, a value corresponding to the value in the noise interval as the voice activation threshold.

In some embodiments, the electronic device in the vehicle is an electronic device mounted in the vehicle or a mobile terminal placed in the vehicle, and the electronic device mounted in the vehicle is a center console, an onboard device, or an intelligent rear view mirror.

It should be noted that, when the voice activation apparatus provided in the foregoing embodiment performs voice activation, only divisions of the foregoing functional modules are described by using an example. During actual application, the foregoing functions may be allocated to and completed by different functional modules according to requirements, that is, the internal structure of the apparatus is divided into different functional modules, to complete all or some of the foregoing described functions. In addition, the voice activation apparatus provided in the foregoing embodiment belongs to the same concept as the embodiment of the voice activation method. In some embodiments, a functional module may be implemented by storing computer instructions on computer readable media and one or more processors. When the executed by the one or more processors, the computer instructions cause the one or more processors to perform the functions of the functional module. For a specific implementation process of the apparatus, refer to the method embodiment, and details are not described herein again.

The sequence numbers of the preceding embodiments of the present disclosure are merely for description purpose but do not indicate the preference of the embodiments.

A person of ordinary skill in the art may understand that all or some of the steps of the foregoing embodiments may be implemented by using hardware, or may be implemented by a program instructing relevant hardware. The program may be stored in a computer-readable storage medium. The storage medium may be a read-only memory, a magnetic disk, a compact disc, or the like.

The foregoing descriptions are not intended to limit the present disclosure. Any modification, equivalent replacement, or improvement made within the spirit and principle of the embodiments of the present disclosure shall fall within the protection scope of the embodiments of the present disclosure.

What is claimed is:

1. A voice activation method applied to an electronic device in a vehicle, comprising:
    capturing a voice signal in a vehicle, the voice signal including a first voice signal captured in a first period from a first timestamp to a second timestamp and a second voice signal captured in a second period from a third timestamp to the first timestamp;

calculating an acoustic score of an activation keyword extracted from the first voice signal, the acoustic score being used for indicating authenticity of the activation keyword, the authenticity of the activation keyword being a probability that the activation keyword is used for waking up the electronic device to perform a voice activation operation, and a magnitude of the acoustic score being positively correlated to a magnitude of the probability;

calculating a noise level in the vehicle by using the second voice signal;

determining a voice activation threshold according to the noise level in the vehicle, a magnitude of the voice activation threshold being negatively correlated to a magnitude of the noise;

comparing the acoustic score of the first voice signal with the voice activation threshold determined according to the noise level calculated from the second voice signal; and performing the voice activation operation when the acoustic score is greater than the voice activation threshold.

2. The method according to claim 1, wherein before the determining a voice activation threshold according to the noise level in the vehicle, the method further comprises:

determining the noise level in the vehicle according to an average decibel value of the second voice signal.

3. The method according to claim 1, wherein before the determining a voice activation threshold according to the noise level in the vehicle, the method further comprises:

determining the noise level in the vehicle according to a vehicle velocity, the magnitude of the noise level is positively correlated to a velocity of the vehicle.

4. The method according to claim 1, wherein the determining a voice activation threshold according to noise in the vehicle comprises:

obtaining a noise interval and a voice activation threshold interval, each value in the noise interval corresponding to one value in the voice activation threshold interval; and selecting the voice activation threshold value according to a value of the noise in the noise interval.

5. The method according to claim 2, wherein the determining a voice activation threshold according to noise in the vehicle comprises:

obtaining a noise interval and a voice activation threshold interval, each value in the noise interval corresponding to one value in the voice activation threshold interval; and selecting the voice activation threshold value according to a value of the noise in the noise interval.

6. The method according to claim 3, wherein the determining a voice activation threshold according to noise in the vehicle comprises:

obtaining a noise interval and a voice activation threshold interval, each value in the noise interval corresponding to one value in the voice activation threshold interval; and selecting the voice activation threshold value according to a value of the noise in the noise interval.

7. The method according to claim 1, wherein the electronic device in the vehicle is an electronic device mounted in the vehicle or a mobile terminal placed in the vehicle, and the electronic device mounted in the vehicle is a center console, an onboard device, or an intelligent rear view mirror.

8. An electronic device, the electronic device comprising:
one or more processors; and
a memory,
the memory storing one or more programs, the one or more programs being configured to be executed by the one or more processors, and the one or more programs comprising instructions for performing the following operations:

capturing a voice signal in a vehicle, the voice signal including a first voice signal captured in a first period from a first timestamp to a second timestamp and a second voice signal captured in a second period from a third timestamp to the first timestamp;

calculating an acoustic score of an activation keyword extracted from the first voice signal, the acoustic score being used for indicating authenticity of the activation keyword, the authenticity of the activation keyword being a probability that the activation keyword is used for waking up the electronic device to perform a voice activation operation, and a magnitude of the acoustic score being positively correlated to a magnitude of the probability;

calculating a noise level in the vehicle by using the second voice signal;

determining a voice activation threshold according to the noise level in the vehicle, a magnitude of the voice activation threshold being negatively correlated to a magnitude of the noise;

comparing the acoustic score of the first voice signal with the voice activation threshold determined according to the noise level calculated from the second voice signal; and performing the voice activation operation when the acoustic score is greater than the voice activation threshold.

9. The electronic device according to claim 8, wherein the one or more programs further comprise instructions for performing the following operation:

determining the noise level in the vehicle according to an average decibel value of the second voice signal.

10. The electronic device according to claim 8, wherein the one or more programs further comprise an instruction used for performing the following operation:

determining the noise in the vehicle according to a vehicle velocity before the determining a voice activation threshold according to noise in the vehicle, wherein the magnitude of the noise is positively correlated to a magnitude of the vehicle velocity.

11. The electronic device according to claim 8, wherein the one or more programs further comprise an instruction used for performing the following operations:

obtaining a noise interval and a voice activation threshold interval, wherein each value in the noise interval corresponds to one value in the voice activation threshold interval; and selecting the voice activation threshold interval, according to a value of the noise in the noise interval, a value corresponding to the value in the noise interval of the voice activation threshold.

12. The electronic device according to claim 9, wherein the one or more programs further comprise an instruction used for performing the following operations:

obtaining a noise interval and a voice activation threshold interval, wherein each value in the noise interval corresponds to one value of the voice activation threshold interval; and selecting the voice activation threshold interval, according to a value of the noise in the noise interval, a value corresponding to the value in the noise interval of the voice activation threshold.

13. The electronic device according to claim 8, wherein the electronic device in the vehicle is an electronic device mounted in the vehicle or a mobile terminal placed in the vehicle, and the electronic device mounted in the vehicle is a center console, an onboard device, or an intelligent rear view mirror.

14. A non-transitory computer-readable storage medium storing computer program instructions executable by at least one processor to perform:
 capturing a voice signal in a vehicle, the voice signal including a first voice signal captured in a first period from a first timestamp to a second timestamp and a second voice signal captured in a second period from a third timestamp to the first timestamp;
 calculating an acoustic score of an activation keyword extracted from the voice signal, the acoustic score being used for indicating authenticity of the activation keyword, the authenticity of the activation keyword being a probability that the activation keyword is used for waking up the electronic device to perform a voice activation operation, and a magnitude of the acoustic score being positively correlated to a magnitude of the probability;
 calculating a noise level in the vehicle by using the second voice signal;
 determining a voice activation threshold according to the noise level in the vehicle, a magnitude of the voice activation threshold being negatively correlated to a magnitude of the noise;
 comparing the acoustic score of the first voice signal with the voice activation threshold determined according to the noise level calculated from the second voice signal; and
 performing the voice activation operation when the acoustic score is greater than the voice activation threshold.

15. The storage medium according to claim 14, wherein the computer program instructions further cause the at least one processor to perform:
 determining the noise level in the vehicle according to an average decibel value of the second voice signal.

16. The storage medium according to claim 14, wherein the computer program instructions further cause the at least one processor to perform:
 determining the noise in the vehicle according to a vehicle velocity before the determining a voice activation threshold according to noise in the vehicle, wherein the magnitude of the noise is positively correlated to a magnitude of the vehicle velocity.

17. The method according to claim 1, wherein capturing the voice signal in the vehicle comprises:
 continuously capturing, by a microphone of the electronic device, the voice signal in the vehicle; and
 sending, by the microphone at intervals of a predetermined time period, segments of the voice signal to a speech recognition module of the electronic device, each segment of the voice signal having the same time length as the predetermined time period;
 wherein the first voice signal is one segment of the voice signal, and the second voice signal is one or more segments of the voice signal.

18. The method according to claim 1, wherein the voice activation threshold corresponding to the first voice signal is determined before the first voice signal is received.

19. The method according to claim 1, wherein:
 a time length of the second period corresponding to the second voice signal is an integer multiple of a time length of the first period corresponding to the first voice signal.

* * * * *